(12) United States Patent
Li et al.

(10) Patent No.: US 12,499,504 B2
(45) Date of Patent: Dec. 16, 2025

(54) SYSTEM AND METHOD FOR ADAPTIVE GRAPH-TO-STREAM SCHEDULING

(71) Applicant: Alibaba (China) Co., Ltd., Hangzhou (CN)

(72) Inventors: Haoran Li, Shanghai (CN); Fei Sun, San Jose, CA (US); Yuan Gao, Shanghai (CN); Ruiguang Zhong, Shanghai (CN)

(73) Assignee: Alibaba (China) Co., Ltd., Hangzhou (CN)

( * ) Notice: Subject to any disclaimer, the term of this patent is extended or adjusted under 35 U.S.C. 154(b) by 194 days.

(21) Appl. No.: 18/530,371

(22) Filed: Dec. 6, 2023

(65) Prior Publication Data
US 2024/0193721 A1    Jun. 13, 2024

(30) Foreign Application Priority Data
Dec. 7, 2022    (CN) .......................... 202211576827.8

(51) Int. Cl.
*G06T 1/20* (2006.01)

(52) U.S. Cl.
CPC ..................... *G06T 1/20* (2013.01)

(58) Field of Classification Search
CPC ............................ G06T 1/20; G06F 9/4881
USPC ................................................. 345/501, 522
See application file for complete search history.

(56) References Cited

U.S. PATENT DOCUMENTS

| | | | |
|---|---|---|---|
| 9,990,687 B1 | 6/2018 | Kaufhold et al. | |
| 10,002,402 B2 | 6/2018 | Liu et al. | |
| 10,169,084 B2 | 1/2019 | John | |
| 10,475,152 B1 * | 11/2019 | Havlir | G06T 1/20 |
| 10,546,393 B2 | 1/2020 | Ray et al. | |
| 10,642,613 B2 | 5/2020 | Kuramoto | |
| 11,164,109 B2 | 11/2021 | Browne et al. | |
| 11,200,982 B2 | 12/2021 | Chen | |
| 11,501,152 B2 | 11/2022 | Yehezkel Rohekar et al. | |
| 11,537,851 B2 | 12/2022 | Guo et al. | |
| 11,561,826 B1 * | 1/2023 | Nagpal | G06N 3/063 |
| 11,573,239 B2 | 2/2023 | Shan et al. | |
| 11,586,905 B2 | 2/2023 | Song et al. | |
| 11,600,035 B2 | 3/2023 | Sarel et al. | |
| 11,645,835 B2 | 5/2023 | Greenblatt et al. | |
| 11,803,739 B2 | 10/2023 | Guo et al. | |

(Continued)

*Primary Examiner* — Jacinta M Crawford

(74) *Attorney, Agent, or Firm* — Sheppard Mullin Richter & Hampton LLP

(57) ABSTRACT

This application describes an accelerator, a computer system, and a method for adaptive graph-to-stream scheduling in processors. An example method may include receiving a computation graph for a GPU, the computation graph comprising (1) a plurality of nodes representing a plurality of kernels for the GPU to execute and (2) a plurality of edges representing execution dependencies among the plurality of kernels; performing one or more wave partitions on the computation graph to determine a plurality of waves of kernels; obtaining a kernel resource table comprising resource usage of each kernel; mapping the plurality of kernels into a plurality of streams based on the plurality of waves and the kernel resource table; and executing the plurality of streams on the GPU, wherein kernels mapped in a same stream are executed sequentially by the GPU, and kernels mapped to different streams are concurrently executable by the GPU.

20 Claims, 7 Drawing Sheets

(56) References Cited

U.S. PATENT DOCUMENTS

| | | |
|---|---|---|
| 2020/0051550 A1 | 2/2020 | Baker |
| 2021/0312627 A1 | 10/2021 | Sekiguchi et al. |
| 2022/0058469 A1 | 2/2022 | Schwartz et al. |
| 2022/0357742 A1 | 11/2022 | Appu et al. |
| 2022/0366526 A1 | 11/2022 | Das et al. |
| 2023/0145253 A1* | 5/2023 | Curtis .................. G06F 9/4881 712/216 |
| 2023/0359873 A1 | 11/2023 | Yao et al. |

* cited by examiner

SYSTEM AND METHOD FOR ADAPTIVE GRAPH-TO-STREAM SCHEDULING

CROSS REFERENCE TO RELATED APPLICATION

This application claims priority to and benefits of Chinese patent Application No. 202211576827.8, filed with the China National Intellectual Property Administration (CNIPA) on Dec. 7, 2022. The entire contents of the above-identified application are incorporated herein by reference.

TECHNICAL FIELD

The disclosure relates generally to balancing the workload among streams in processors with an adaptive job scheduler.

BACKGROUND

Using dedicated processors such as graphics processing units (GPUs) for deep learning (DL) has become a norm. Recent DL frameworks improve inference and training speed by offloading compute-intensive parts of their DL workloads onto GPUs or other similar dedicated processors. In GPU terms, this is known as launching kernels. Launching a kernel may involve a host Central Processing Unit (CPU) scheduling the kernel to the GPU. When those kernels are many and of short duration, launch overhead can become a problem. Recent commercial GPU products offer one way of reducing that overhead by representing the kernels as a Computation Graph and launching the computation graph to GPU as a single operation instead of launching kernels one-by-one by the host CPU. On GPUs, multi-stream (e.g., HyperQ™) is a mechanism for realizing kernel execution concurrency. How to map the kernels in a computation graph to the multi-stream in the GPU is essential for GPU utilization efficiency and overall computation performance.

SUMMARY

Various embodiments of the present specification may include hardware circuitries, systems, and methods for automatic and adaptive graph-to-stream scheduling for GPUs.

In some aspects, the techniques described herein relate to a computer-implemented method, including: receiving a computation graph for a graphics processing unit (GPU), the computation graph including (1) a plurality of nodes representing a plurality of kernels for the GPU to execute and (2) a plurality of edges representing execution dependencies among the plurality of kernels; performing wave partitions on the computation graph to determine a plurality of waves of kernels, each wave including kernels that concurrently executable on the GPU; obtaining a kernel resource table including resource usage of each kernel; mapping the plurality of kernels into a plurality of streams based on the plurality of waves and the kernel resource table; and executing the plurality of streams on the GPU, wherein kernels mapped in a same stream are executed sequentially by the GPU, and kernels mapped to different streams are executed concurrently by the GPU.

In some aspects, the techniques described herein relate to a method, wherein the mapping the plurality of kernels into the plurality of streams based on the plurality of waves and the kernel resource table includes: for kernels from a same wave of the plurality of waves, identifying one or more kernels with resource usage being greater than a threshold; assigning the one or more identified kernels to a same stream; and assigning other kernels from the same wave to the plurality of streams in a round-robin manner.

In some aspects, the techniques described herein relate to a method, wherein the obtaining of the kernel resource table including the resource usage of each kernel represented in the computation graph includes: obtaining the kernel resource table from a compiler compiling the plurality of kernels.

In some aspects, the techniques described herein relate to a method, wherein the performing wave partitions on the computation graph to determine the plurality of waves of kernels includes: performing a breadth-first search (BFS) on the computation graph to determine the depth for each of the plurality of nodes in the computation graph; and determining kernels from a same depth as a wave of kernels.

In some aspects, the techniques described herein relate to a method, wherein the performing BFS on the computation graph to determine the depth for each of the plurality of nodes includes: when one node appears on more than one paths in the computation graph, determining, based on BFS, more than one depths of the node respectively corresponding to the more than one paths; and determining a maximum depth of the more than one depth as a depth of the node.

In some aspects, the techniques described herein relate to a method, wherein the plurality of streams include Compute Unified Device Architecture (CUDA) streams.

In some aspects, the techniques described herein relate to a method, further including: inserting synchronization kernels into one or more of the streams to maintain kernel dependency correctness between kernels.

In some aspects, the techniques described herein relate to a method, wherein the inserting synchronization kernels includes: when a kernel at the head of a first stream depends on execution of a kernel at the head of a second stream, inserting a synchronization kernel before the kernel at the head of the first stream so that the GPU executes the kernel at the head of the first stream only when the kernel at the head of a second stream is executed.

In some aspects, the techniques described herein relate to a method, further including: detecting load imbalance among the plurality of streams periodically; and remapping a kernel from one stream to another stream to balance load among the plurality of streams.

In some aspects, the techniques described herein relate to a method, wherein the computation graph is being executed by the GPU for a plurality of iterations, and the remapping of the kernel from one stream to the other stream only affects the current iteration of executing the computation graph but not future iterations.

In some aspects, the techniques described herein relate to a method, wherein the executing of the plurality of streams on the GPU includes: fetching kernels from heads of the plurality of streams; and dispatching the fetched kernels to a plurality of Streaming Multiprocessors (SMs) for parallel processing.

In some aspects, the techniques described herein relate to a method, wherein the fetching of the kernels from the heads of the plurality of streams includes: fetching kernels from the heads of the plurality of streams in a round-robin manner.

In some aspects, the techniques described herein relate to a hardware accelerator for automatic and adaptive graph-to-stream scheduling for graphics processing units (GPUs), including: a graph wave partition module configured to: receive a computation graph for a GPU, the computation graph including (1) a plurality of nodes representing a plurality of kernels for the GPU to execute and (2) a plurality of edges representing execution dependencies among the plurality of kernels; and perform wave partitions on the computation graph to determine a plurality of waves of kernels, each wave including kernels that concurrently executable on the GPU; a kernel resource usage module configured to: obtain a kernel resource table including resource usage of each kernel; a kernel-stream mapping module configured to: map the plurality of kernels into a plurality of streams based on the plurality of waves and the kernel resource table; and a global dispatcher configured to: dispatch the mapped kernels in the plurality of streams into a plurality of Streaming Multiprocessors (SMs) for parallel processing.

In some aspects, the techniques described herein relate to a hardware accelerator, wherein the kernel resource usage module is further configured to: obtain the kernel resource table from a compiler compiling the plurality of kernels.

In some aspects, the techniques described herein relate to a hardware accelerator, wherein the graph wave partition module is further configured to: perform a breadth-first search (BFS) on the computation graph to determine the depth for each of the plurality of nodes in the computation graph; and determine kernels from a same depth as a wave of kernels.

In some aspects, the techniques described herein relate to a hardware accelerator, wherein the plurality of streams include Compute Unified Device Architecture (CUDA) streams.

In some aspects, the techniques described herein relate to a hardware accelerator, further including: a sync insertion module configured to: when a kernel at the head of a first stream depends on execution of a kernel at the head of a second stream, insert a synchronization kernel before the kernel at the head of the first stream so that the GPU executes the kernel at the head of the first stream only when the kernel at the head of a second stream is executed.

In some aspects, the techniques described herein relate to a hardware accelerator, further including: a kernel re-mapping module configured to: detect load imbalance among the plurality of streams periodically; and remap a kernel from one stream to another stream to balance load among the plurality of streams.

In some aspects, the techniques described herein relate to a hardware accelerator, wherein the computation graph is being executed by the GPU for a plurality of iterations, and the remapping of the kernel from one stream to the other stream only affects the current iteration of executing the computation graph but not future iterations.

In some aspects, the techniques described herein relate to a non-transitory computer-readable storage medium, the storage medium storing instructions that, when executed by one or more processors, cause the one or more processors to perform operations including: receiving a computation graph for a graphics processing unit (GPU), the computation graph including (1) a plurality of nodes representing a plurality of kernels for the GPU to execute and (2) a plurality of edges representing execution dependencies among the plurality of kernels; performing wave partitions on the computation graph to determine a plurality of waves of kernels, each wave including kernels that concurrently executable on the GPU; obtaining a kernel resource table including resource usage of each kernel; mapping the plurality of kernels into a plurality of streams based on the plurality of waves and the kernel resource table; and executing the plurality of streams on the GPU, wherein kernels mapped in a same stream are executed sequentially by the GPU, and kernels mapped to different streams are executed concurrently by the GPU.

These and other features of the systems, methods, and hardware devices disclosed, and the methods of operation and functions of the related elements of structure and the combination of parts and economies of manufacture will become more apparent upon consideration of the following description and the appended claims referring to the drawings, which form a part of this specification, where like reference numerals designate corresponding parts in the figures. It is to be understood, however, that the drawings are for illustration and description only and are not intended as a definition of the limits of the invention.

DETAILED DESCRIPTION

The specification is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present specification. Thus, the specification is not limited to the embodiments shown but is to be accorded the widest scope consistent with the principles and features disclosed herein.

The performance of GPU architectures continues to increase with every new generation. Modern GPUs are so fast that, in many cases of interest, the time taken by each GPU operation (e.g. kernel or memory copy) is now measured in microseconds. However, there are overheads associated with the submission of each operation to the GPU, which are now becoming significant in an increasing number of scenarios.

Real-world applications perform large numbers of GPU operations: a typical pattern involves many iterations (or timesteps), with multiple operations within each step. For example, simulations of molecular systems iterate over many time steps, where the position of each molecule is updated at each step based on the forces exerted on it by the other molecules. For a simulation technique to accurately model such systems, typically multiple algorithmic stages corresponding to multiple GPU operations are required per timestep. If each of these operations is launched to the GPU separately and completes quickly, then overheads can combine to form a significant overall degradation in performance.

Figure 1:
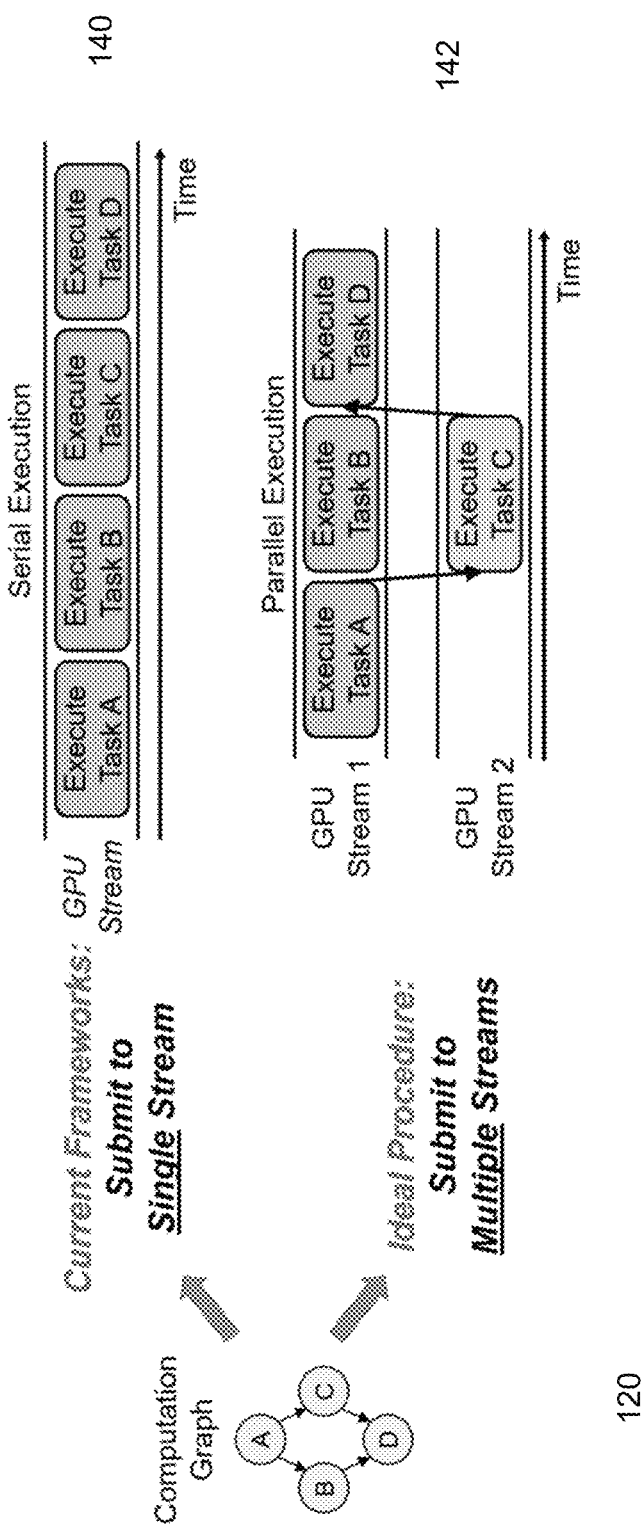
FIG. 1 illustrates an exemplary workflow for scheduling computation tasks on GPUs in accordance with some embodiments.

To address the above issues, commercial GPU products design computation graphs to allow work/kernels to be defined as graphs rather than single operations, which is illustrated in FIG. 1. It is appreciated that GPUs are used for illustrative purposes, and throughout this disclosure, processors equivalent to GPUs or providing parallel processing (e.g., dedicated processors, neural processors, etc.) can also be used unless otherwise specified.

FIG. 1 illustrates an exemplary workflow for scheduling computation tasks on GPUs in accordance with some embodiments. The workflow illustrated in FIG. 1 provides a mechanism to represent a plurality of GPU kernels as a computation graph 120, and launch the computation graph through a single CPU operation and hence reducing overheads. In the context of GPU, a kernel refers to a function executed on the GPU. The computation graph 120 includes a plurality of nodes representing the kernels and a plurality of edges representing the dependencies among the kernels. A first kernel depending on a second kernel (e.g., represented by an arrow from the second kernel and pointing to the first kernel node) may be executed after the second kernel is executed.

However, reducing the launching overhead is just the first step to optimizing the overall computation performance of GPUs. The next step is how to exploit the full parallelism within the GPUs. It is well-known that GPUs have a powerful capability to run thousands of threads concurrently. For instance, multi-stream mechanism may be used in GPUs to implement kernel execution concurrency, where kernels from different streams may be run concurrently if resources (GPU computation power and/or memory space) are enough, and kernels inside one stream are executed sequentially in FIFO (First-In-First-Out) order.

There are two ways to utilize the GPU power: (1) making the most use of GPU cores in a single GPU stream 140, and (2) running multiple GPU tasks concurrently using multiple GPU streams 142. The single-stream scheme is to make every kernel maintain a sufficient level of intra-kernel parallelism so that each can take full advantage of GPU's computation power on its own. However, depending on the implementation of the kernel and the size of the tensor being computed within each kernel, there may be a deficiency in the level of intra-kernel parallelism, which may lead to serialized executions of all kernels and potentially low utilization. In comparison, the multi-stream scheme better promises full utilization of GPU computing power for most occasions. As shown in FIG. 1, executing tasks B and C in parallel using two streams may improve the overall computation efficiency.

Existing implementations of the multi-stream scheme involve manually assigning kernels to different streams in a round-robin way. These approaches are inefficient because they require programmer's effort to carefully map the graph of kernels to the multiple streams (e.g., not automatically) considering the dependencies and resource consumptions, and the graph-stream mapping is static and not adaptive (e.g., when new kernels are submitted to the GPUs, the execution performance of the current computation graph may be affected).

To overcome the above-identified technical shortcomings of the existing implementations, this disclosure describes an automatic and adaptive graph-to-stream mapping in scheduling GPU kernels in order to maximize the parallel processing within the GPUs.

The following terms are given exemplary definitions for a better understanding of the present disclosure:

Stream: it may refer to a sequence of device operations (e.g. kernel launches) that are processed by the GPU device in order.

Work queue: it may refer to a hardware in-order queue on GPU to receive kernel launch commands from streams. A kernel scheduler will select a command from one of the work queues and launch the computation on GPU. A work queue may refer to a hardware implementing a stream.

Streaming multiprocessors (SM): it may refer to a basic computing unit to execute a thread block. It may include hardware resources for execution such as execution units, registers, L1 cache/shared memory, etc. Multiple thread blocks can reside on the same SM.

Streaming processor (SP): it may refer to a basic computing unit to execute a warp.

Warp: it may refer to a collection of threads (e.g., 32 threads) and is the basic unit of execution and scheduling.

Thread block: it may refer to a programming abstraction that presents a group of threads that can be executed concurrently on one SM and share the same L1/shared memory.

Figure 2A:
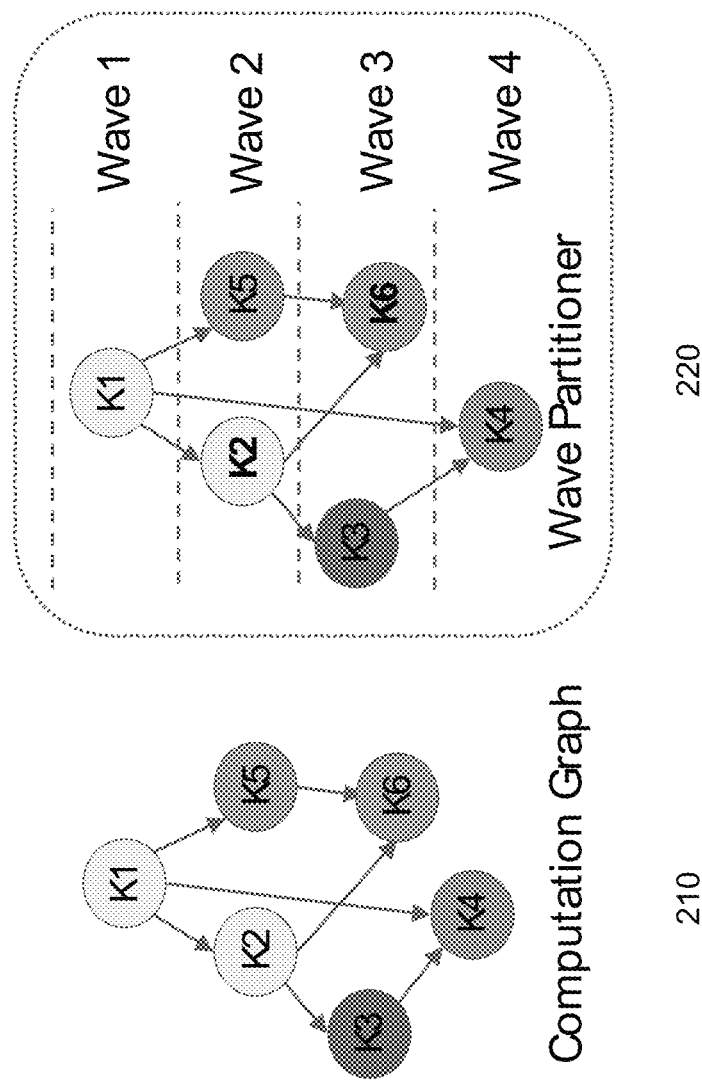
FIG. 2A illustrates an exemplary diagram for wave-partitioning a computation graph in accordance with some embodiments.

FIG. 2A illustrates an exemplary diagram for wave-partitioning a computation graph in accordance with some embodiments. Note that two kernels can be parallelly processed when (1) the two kernels do not have dependencies, and (2) there are sufficient resources for executing the two kernels concurrently. This computation graph partitioning step is designed to identify, from the kernel dependencies' perspective, the kernels that may be executed concurrently across multiple streams. These kernels in the computation graph may be partitioned into a plurality of waves of kernels. The kernels within each wave are independent of each other and may be executed concurrently on the GPU. The kernels in a given wave (denoted as the (i+1)-th wave) may be dependent on kernels in any of the preceding waves, and thus may not be executed until the i-th wave is executed.

Using the computation graph 210 in FIG. 2A as an example, K2 and K5 depend on the execution of K1, K3 and K6 depend on the execution of K2, K6 depends on the execution of K2 and K5, and K4 depends on the execution of K1 and K3. In order to partition the computation graph, the breadth-first search (BFS) algorithm may be executed from the root node, e.g., K1, to determine the depth for each of the plurality of nodes in the computation graph. The nodes with the same depth may be partitioned into the same wave. Here, the "depth" of a node may refer to the distance between the root node and the node. For instance, BTS from K1 may determine that K1 has a depth of 0, K2 and K5 have a depth of 1, K3 and K6 have a depth of 2, and K4 has a depth of 3. Based on the node depths, the wave partitioner 220 may partition K1 into wave 1, K2 and K5 into wave 2, K3 and K6 into wave 3, and K4 into wave 4.

In some embodiments, the computation graph may have a node that exists in multiple paths from the root note, which means the corresponding kernel depends on multiple preceding kernels. The BFS algorithm may compute multiple depths for this node using different paths, and these depths may be different. In these cases, the maximum value among the multiple depths may be selected as the depth of the node for the purpose of wave partitioning. For instance, K4 in the computation graph 210 may have a depth of 1 (using the path from K1 to K4) and a depth of 3 (using the path from K1, K2, K3, to K4) according to the BFS, and the depth of 3 may be used as the final depth of K4.

After the computation graph 210 is partitioned into waves, the kernels are divided based on the dependencies, in which kernels from a same wave are independent of each other. However, as explained above, whether two kernels can be currently executed also depends on the resource demands of the two kernels. It means, it is possible that two independent kernels cannot be executed concurrently on the GPU because there is insufficient resources. Here, the resources may include one or more of: a number of thread blocks, a number of threads, a number of registers, a size of shared memory, etc. Therefore, the graph-to-stream mapping also needs to take kernel resource usage into account when mapping the kernels to multiple streams to achieve optimal concurrency.

Figure 2B:
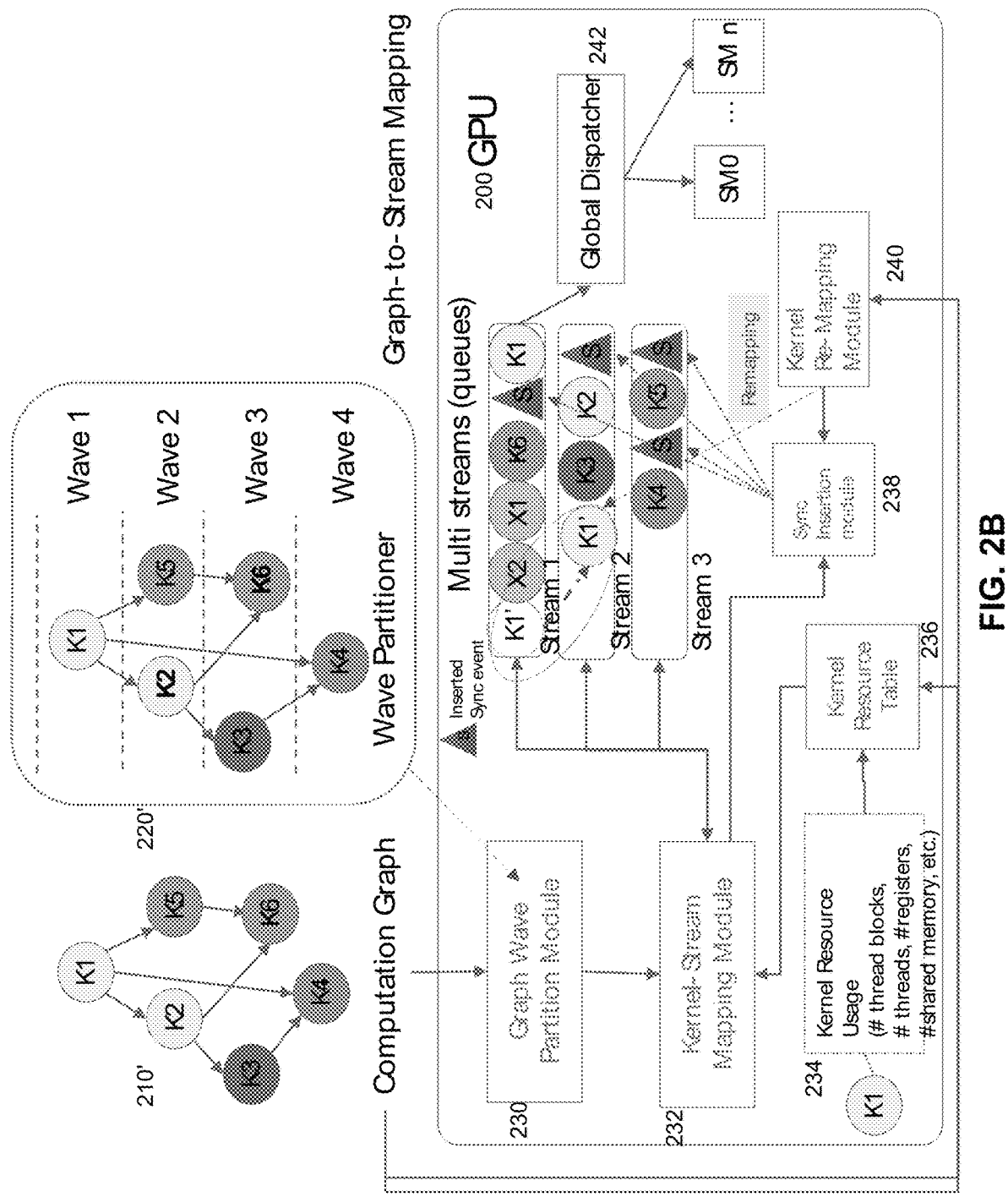
FIG. 2B illustrates a diagram of graph-to-stream mapping for a GPU in accordance with some embodiments.

FIG. 2B illustrates a diagram of graph-to-stream mapping for a GPU 200 in accordance with some embodiments. In the example shown in FIG. 2B, the computation graph 210' is being mapped into three streams before being dispatched for processing in a GPU using various functions (represented as modules in FIG. 2B). Although the modules in FIG. 2B are illustrated as internal modules (e.g., a front-end interface) of the GPU 200, some of them may be implemented in a job scheduler or an accelerator that is external to the GPU 200. In some embodiments, these modules may be implemented by one or more corresponding circuitries.

In some embodiments, the graph-to-stream mapping may start with partitioning the computation graph 210' into multiple waves 220' using a graph wave partition module 230. The graph wave partition module 230 may execute breadth-first search (BFS) on the computation graph 210' to partition the graph nodes (kernels) into a plurality of waves 220', where the kernels in the same wave are independent of each other and may be executed with concurrency. The partition process may be similar to the exemplary implementation described in FIG. 2A.

In some embodiments, the graph-to-stream mapping may determine kernel resource usage 234 for each of the plurality of kernels represented by the computation graph 210. Some exemplary resources may include a number of thread blocks, a number of threads, a number of registers, a size of shared memory, etc. In some embodiments, each kernel's resource usage 234 may be obtained at the time of compiling from the compiler. In some embodiments, the kernel resource usage 234 may be stored in a kernel resource table 236.

In some embodiments, both the wave partition output from the graph wave partition module 230 and the kernel resource table 236 may be fed into a kernel-stream mapping module 232 to assign the waves of kernels into the available streams. In some cases, the streams may refer to Compute Unified Device Architecture (CUDA) streams. The kernels within the same stream are dispatched in a FIFO manner to SMs for sequential execution, and the kernels from different streams may be dispatched to SMs for concurrent execution. In some embodiments, the assignment comprises an iterative process executing the following two rules: (1) assigning kernels from the same wave to different streams in a round-robin way, and (2) assigning most resource-intensive kernels from the same wave to the same stream.

One rationale behind rule (1) is that the kernels from the same wave are independent of each other and thus can be executed concurrently, and assigning them to different streams may allow the GPU to concurrently execute these independent kernels. One rationale behind rule (2) is that even though the most resource-intensive kernels from the same wave are independent of each other, the GPU may not be able to execute them concurrently because of the resource constraint. Therefore, assigning them to different streams will not only fail to achieve concurrent execution but also introduce serialization between the these streams, which effectively delays other kernels assigned to these streams. For these reasons, rule (2) is implemented to assign these resource-intensive kernels to the same stream and allows the GPU to execute them in a serialized way (as kernels within the same stream will be executed in a FIFO manner) without blocking the execution of other kernels assigned to other streams (e.g., available streams except for the one assigned with the resource-intensive kernels).

An exemplary implementation of the iterative process may include: sorting the kernels from a same wave based on the resource usages, identifying the kernels with resource usages beyond the available resource on the GPU, assigning the identified kernels to a same stream, assigning the rest of the kernels to the available streams in a round-robin manner. The available resource on the GPU may be predetermined as a threshold. In some embodiments, the resource usage may be a weighted sum of different types of resource demands, and the threshold may be learned through experiments or domain knowledge.

The above-described iterative process handles intra-wave stream mappings, and the focus is now shifted to inter-wave stream mappings. The sequence of the plurality of waves indicate data dependencies, thus kernels from the (i+1)-th wave may not be executed before the kernels from the i-th wave are executed. Therefore, in some embodiments, a sync insertion module 238 may be configured to insert synchronization kernels into one or more of the streams to maintain kernel dependency correctness between streams. In particular, when a kernel at the head of a first stream depends on an execution of a kernel at the head of a second stream, a synchronization kernel may be inserted before the kernel at the head of the first stream so that the GPU executes the kernel at the head of the first stream only when the kernel at the head of a second stream is executed. Here, the "head" of a stream refers to the first kernel in the stream. For instance, as shown in FIG. 2B, K2 and K5 should not be executed until K1 is executed. After K1 is assigned to stream 1, directly assign K2 and K5 to streams 2 and 3 may cause K1, K2, and K5 to be concurrently executed by the GPU (e.g., fetching the first kernel from all available streams for parallel processing). To maintain the dependencies, synchronization kernels (e.g., dummy kernels) may be inserted into streams 2 and 3 before K2 and K5 so that K1 is executed by the GPU before K2 and K5. Similarly, before assigning K6 to stream 1, a synchronization kernel may be inserted between K1 and K6 so that K6 is not executed until K2 and K5 are executed.

In some cases, the above-described kernel assignment process and/or the real-time execution of the kernels may lead to workload imbalance among the multiple streams. In real-time execution, kernels from other workloads may also be assigned to the streams. For instance, kernels X1 and X2 may be assigned to the streams 1, 2, and 3 along with K1-K6 of the current computation graph 210'. The assignment of X1 and X2 may also cause workload imbalance. To alleviate the imbalance, a kernel re-mapping module 240 may be configured to, periodically, detect load imbalance among the plurality of streams and remap a kernel from one stream to another stream to balance load among the plurality of streams. As shown in FIG. 2B, K1' was initially assigned to stream 1, and is remapped to stream 2 to balance the workload. Here, K1-K6 may refer to the kernels to be executed in a first iteration of the workload (e.g., in GPU workload, some workload may include executing the same group of kernels for multiple iterations), and K1' refers to the first kernel of the workload to be executed in the second iteration. K1' may be initially assigned to stream 1 because its corresponding counterpart from the previous iteration K1 was assigned to stream 1 previously. However, the kernel re-mapping module 240 may detect that under the current situation, K1' may be assigned to stream 2 to balance the load. The remapping (e.g., of K1' from stream 1 to stream 2) may only affect the current iteration but not future iterations. That is, K" (the first kernel of the workload to be executed in the third) iteration may still be initially assigned to stream 1, but subject to the remapping by the kernel re-mapping module 240 for load balance purposes.

After the graph-to-stream mapping is finished, or while the graph-to-stream mapping is on-going, the global dispatcher 242 of the GPU may start fetching kernels from heads of the plurality of streams and dispatch the fetched kernels to a plurality of Streaming Multiprocessors (SMs) for parallel execution. In some embodiments, the global dispatcher 242 may fetch kernels from the heads of the plurality of streams in a round-robin manner. When the global dispatching 242 detects that a fetched kernel cannot be executed due to insufficient resources, it pauses its execution until the kernel is executed before fetching more kernels from other streams.

Figure 3:
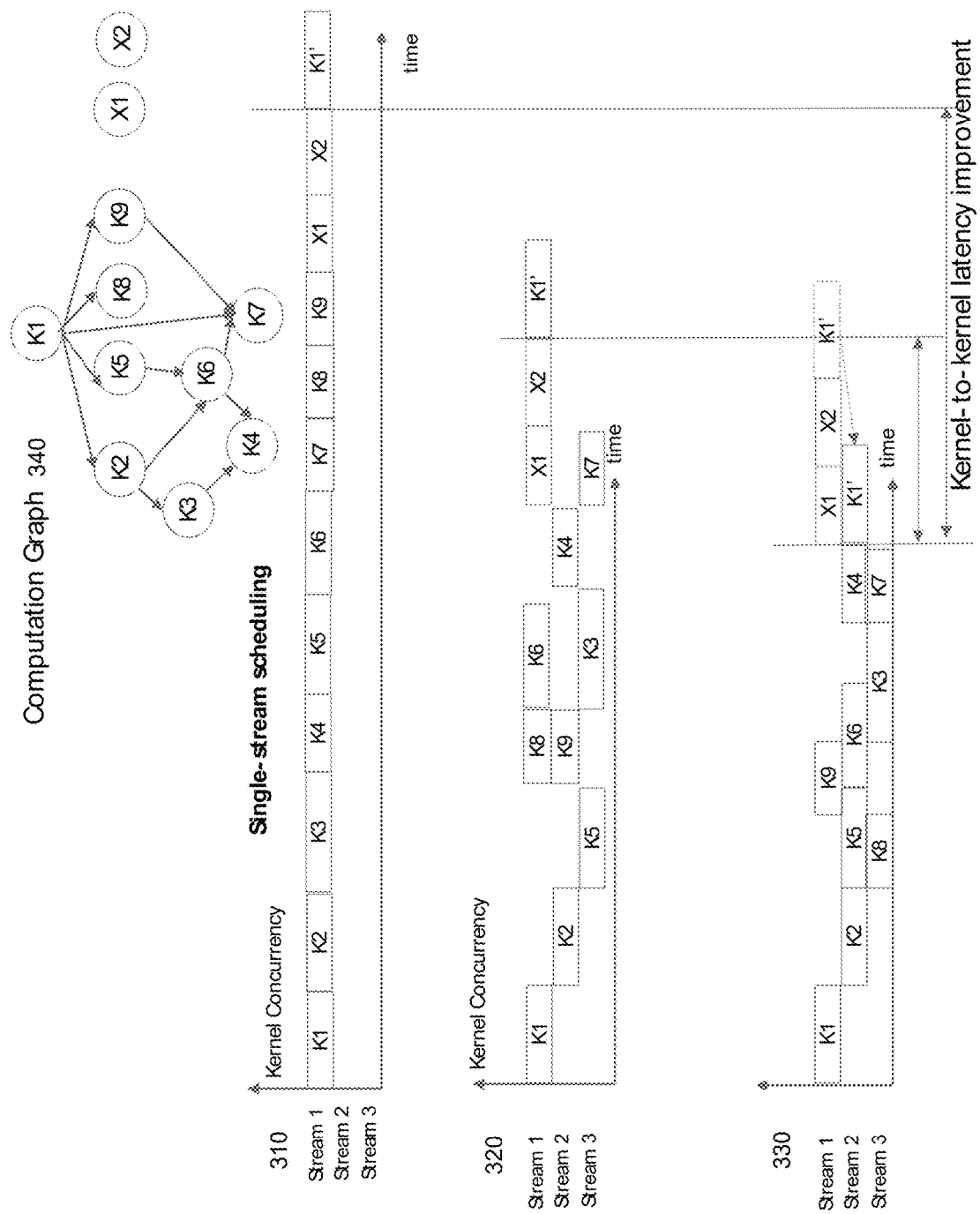
FIG. 3 illustrates a performance comparison among different graph-to-stream scheduling methods in accordance with some embodiments.

FIG. 3 illustrates a performance comparison among different graph-to-stream scheduling methods in accordance with some embodiments. In the example illustrated in FIG. 3, a computation graph 340 with a plurality of kernels K1-K9 and a plurality of dependency edges is used as example workload for graph-to-stream scheduling into three streams (stream 1-3). In addition to the kernels within the computation graph 340, additional kernels X1 and X2 from other workloads (e.g., other computation graph(s) that is not shown in FIG. 3) also need to be scheduled into the three streams. The charts 310, 320, and 330 illustrate how the kernels are mapped into the streams. It is assumed that the runtime of each kernel is the same or similar, and thus the width of each bar (representing an execution of a corresponding kernel) is the same or similar in the charts.

Chart 310 illustrates a single-stream scheduling method, in which all the kernels are assigned to the same stream. This scheduling method may work well when the kernels are all inter-dependent and need to be executed sequentially. However, when there are kernels that may be executed concurrently, the single-stream scheduling method may cause low GPU utilization.

Chart 320 illustrates a graph-to-stream scheduling with wave-partitioning illustrated in FIG. 2A. In particular, the kernels in the graph 340 are partitioned into waves using algorithms like BFS, in which kernels with the same depth (e.g., depth from a root node in the graph 340) are clustered into a same wave. The kernels within each wave are independent of each other, and kernels in (i+1)-th wave may not be executed until the kernels in i-th wave are executed, where i is an integer and i>=1 (assuming the root node K1 is partitioned into the first wave). The graph-to-stream mapping for chart 320 may iterate through the waves in order and schedule the kernels from each wave to the available streams in a round-robin manner. For instance, assuming K1 is in wave 1 and K2, K5, K8, and K9 are in wave 2, K1 is mapped to stream 1, K2 is mapped to stream 2, K5 is mapped to stream 3, K8 is mapped to stream 1 again (round-robin the streams), and K9 is mapped to stream 2. In the computation graph, it is further assumed that K2 and K5 are resource-intensive tasks and K2 cannot be executed concurrently by the GPU. Since this scheduling method does not consider the resource consumption of the kernels, K2 and K5 are mapped to two different streams merely because they are from the same stream. This is different in chart 330.

Chart 330 illustrates a graph-to-stream scheduling method with both wave-partitioning illustrated in FIG. 2A and the kernel resource usage table illustrated in FIG. 2B. In addition to partitioning the kernels in the graph 340 into waves using algorithms like BFS, each kernel's resource usage is also taken into account for scheduling. As described in FIG. 2B, the scheduler may iterate through the waves in order, and map the kernels into the streams by following two rules: (1) assigning kernels from the same wave to different streams in a round-robin way, and (2) assigning the most resource-intensive kernels from the same wave to the same stream. When there is a conflict, rule (2) has priority over rule (1). In the example illustrated in FIG. 3, since K2 and K5 are both resource-intensive, they are mapped to the same stream (stream 2) as shown in chart 330 according to rule (2). This way, other independent kernels from the same wave may be concurrently executed sooner. For instance, K8 in chart 330 is now mapped to stream 3 and may be executed right after K2 is executed and concurrently with K5.

From the comparison illustrated in FIG. 3, the scheduling shown in chart 330 is more efficient than the scheduling shown in charts 310 and 320. That is, the automatic and adaptive graph-to-stream scheduling method with both wave-partitioning illustrated in FIG. 2A and the kernel resource usage table illustrated in FIG. 2B offers a technical improvement over the other scheduling methods.

Figure 4A:
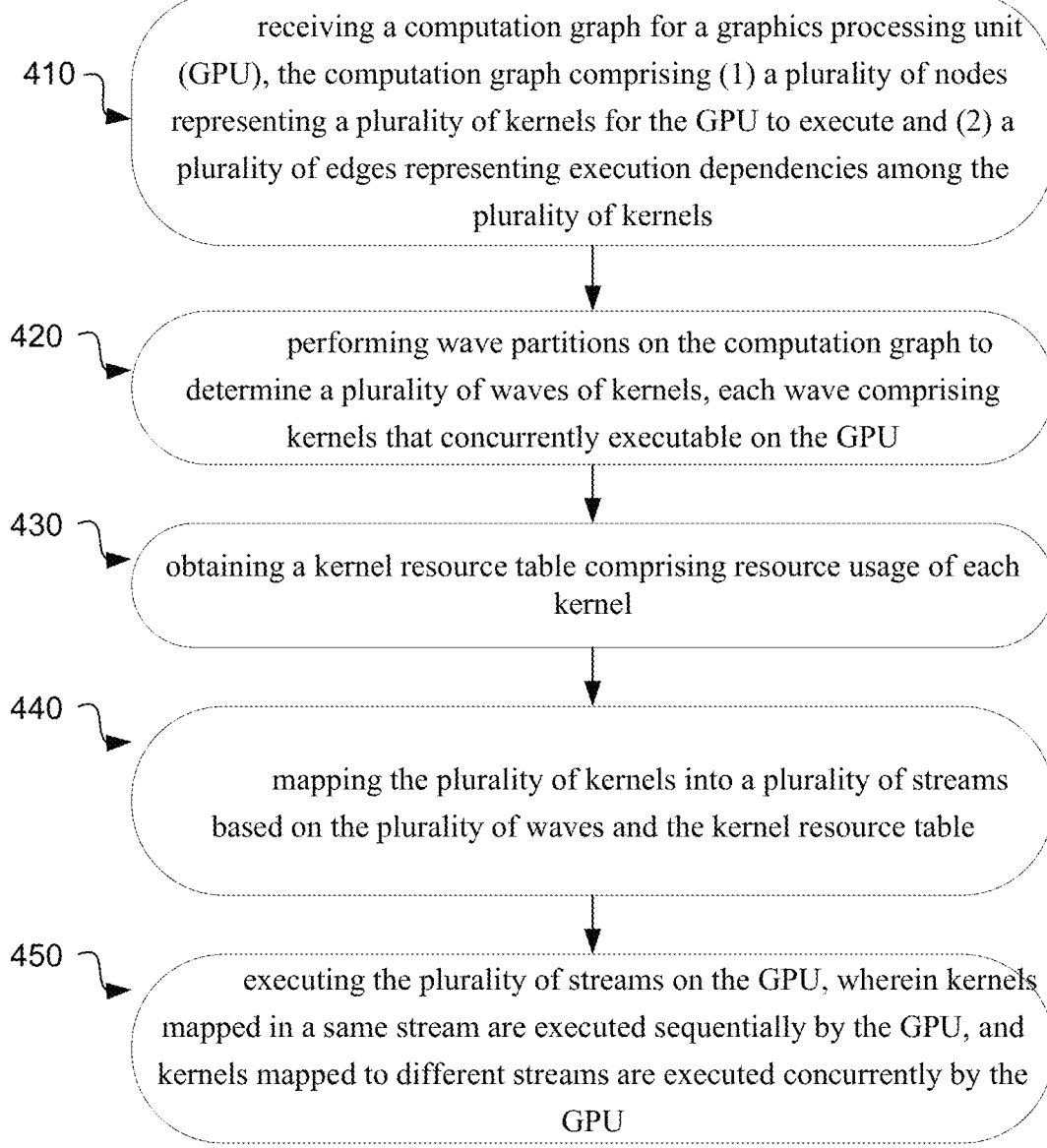
FIG. 4A illustrates an exemplary method of graph-to-stream mapping for a GPU in accordance with some embodiments.

FIG. 4A illustrates an exemplary method 400 of graph-to-stream mapping for a GPU in accordance with some embodiments. The method 400 may be implemented by a system illustrated in FIG. 4B or in a hardware environment illustrated in FIG. 5. The exemplary steps of the method 400 are illustrated in blocks as shown in FIG. 4A.

Block 410 includes receiving a computation graph for a graphics processing unit (GPU), the computation graph comprising (1) a plurality of nodes representing a plurality of kernels for the GPU to execute and (2) a plurality of edges representing execution dependencies among the plurality of kernels.

Block 420 includes performing wave partitions on the computation graph to determine a plurality of waves of kernels, each wave comprising kernels that are concurrently executable on the GPU. In some embodiments, the performing wave partitions on the computation graph to determine the plurality of waves of kernels comprises: performing breadth-first search (BFS) on the computation graph to determine the depth for each of the plurality of nodes in the computation graph; and determining kernels from a same depth as a wave of kernels. In some embodiments, the performing BFS on the computation graph to determine the depth for each of the plurality of nodes may include: when one node appears on more than one path from the root node in the computation graph, determining, based on BFS, more than one depths of the node respectively corresponding to the more than one paths; and determining a maximum depth of the more than one depth as a depth of the node.

Block 430 includes obtaining a kernel resource table comprising resource usage of each kernel. In some embodiments, the obtaining of the kernel resource table comprising the resource usage of each kernel represented in the computation graph comprises: obtaining the kernel resource table from a compiler compiling the plurality of kernels.

Block 440 includes mapping the plurality of kernels into a plurality of streams based on the plurality of waves and the kernel resource table. In some embodiments, the mapping the plurality of kernels into the plurality of streams based on the plurality of waves and the kernel resource table comprises: for kernels from a same wave of the plurality of waves, identifying one or more kernels with resource usage being greater than a threshold; assigning the one or more identified kernels to a same stream; and assigning other kernels from the same wave to the plurality of streams in a round-robin manner. In some embodiments, the plurality of streams comprise Compute Unified Device Architecture (CUDA) streams.

Block 450 includes executing the plurality of streams on the GPU, wherein kernels mapped in a same stream are executed sequentially by the GPU, and kernels mapped to different streams are executed concurrently by the GPU. In some embodiments, the executing of the plurality of streams on the GPU comprises: fetching kernels from heads of the plurality of streams; and dispatching the fetched kernels to a plurality of Streaming Multiprocessors (SMs) for parallel execution. In some embodiments, the fetching of the kernels from the heads of the plurality of streams comprises: fetching kernels from the heads of the plurality of streams in a round-robin manner.

In some embodiments, method 400 may further include inserting synchronization kernels into one or more of the streams to maintain kernel dependency correctness between kernels. In some embodiments, the inserting synchronization kernels comprises: when a kernel at the head of a first stream depends on an execution of a kernel at the head of a second stream, inserting a synchronization kernel before the kernel at the head of the first stream so that the GPU executes the kernel at the head of the first stream only when the kernel at the head of a second stream is executed.

In some embodiments, method 400 may further include detecting load imbalance among the plurality of streams periodically; and remapping a kernel from one stream to another stream to balance load among the plurality of streams. In some embodiments, the computation graph is being executed by the GPU for a plurality of iterations, and the remapping of the kernel from one stream to the other stream only affects the current iteration of executing the computation graph but not future iterations.

Figure 4B:
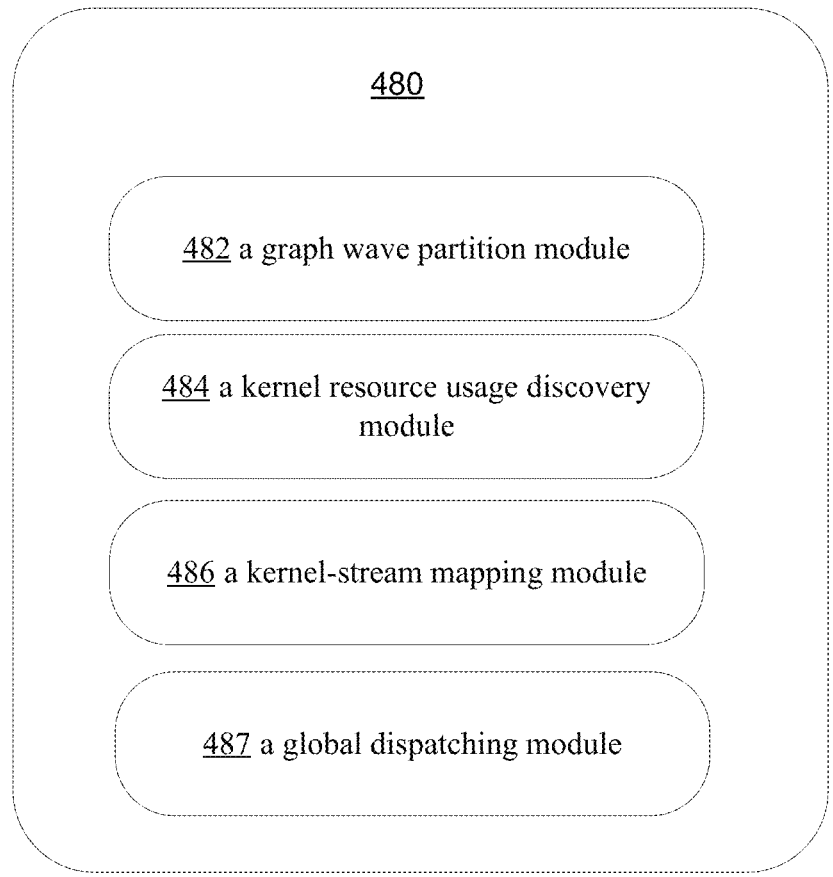
FIG. 4B illustrates an exemplary diagram of a system for implementing graph-to-stream mapping for a GPU in accordance with some embodiments.

FIG. 4B illustrates an exemplary diagram of a system 480 for implementing graph-to-stream mapping for a GPU in accordance with some embodiments. The components in the system 480 are for illustrative purposes only. Depending on the implementation, the system 480 may include more, fewer, or alternative components. In some embodiments, the system 480 may refer to a front-end of a GPU or an accelerator coupled with the GPU.

In some embodiments, the system 480 includes a graph wave partition module 482, a kernel resource usage module 484, a kernel-stream mapping module 486, and a global dispatching module 487. The graph wave partition module 482 may be configured to receive a computation graph for a GPU, the computation graph comprising (1) a plurality of nodes representing a plurality of kernels for the GPU to execute and (2) a plurality of edges representing execution dependencies among the plurality of kernels; and perform wave partitions on the computation graph to determine a plurality of waves of kernels, each wave comprising kernels that concurrently executable on the GPU. The kernel resource usage module 484 may be configured to obtain a kernel resource table comprising the resource usage of each kernel. The kernel-stream mapping module 486 may be configured to map the plurality of kernels into a plurality of streams based on the plurality of waves and the kernel resource table. The global dispatching module 487 may be configured to dispatch the mapped kernels in the plurality of streams into a plurality of Streaming Multiprocessors (SMs) for parallel processing.

In some embodiments, the system 480 may further include a sync insertion module configured to, when a kernel at the head of a first stream depends on execution of a kernel at the head of a second stream, insert a synchronization kernel before the kernel at the head of the first stream so that the GPU executes the kernel at the head of the first stream only when the kernel at the head of a second stream is executed.

In some embodiments, the system 480 may further include a kernel re-mapping module configured to: detect load imbalance among the plurality of streams periodically; and remap a kernel from one stream to another stream to balance load among the plurality of streams.

Figure 5:
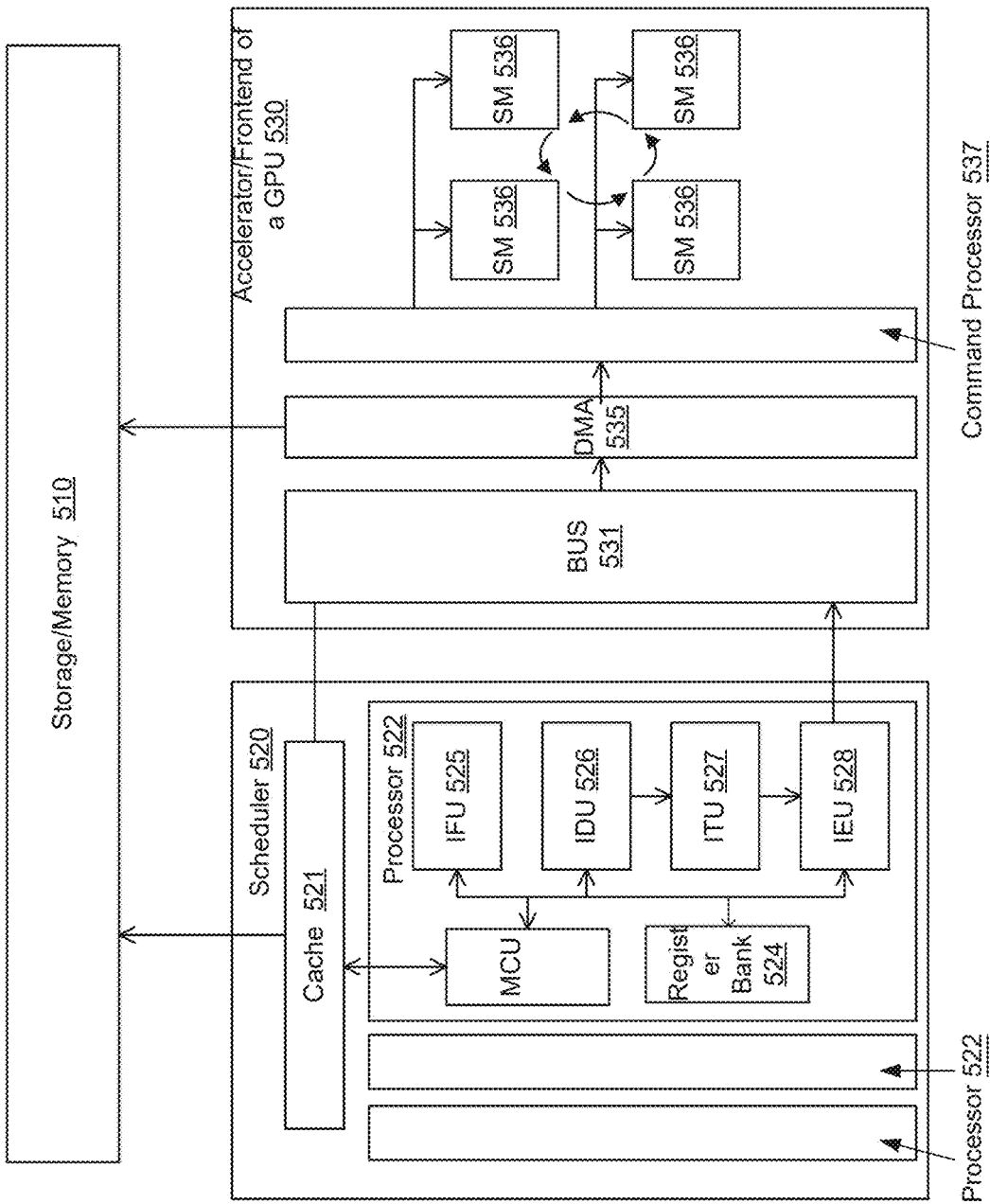
FIG. 5 illustrates an exemplary schematic diagram of a hardware environment for implementing graph-to-stream mapping for a GPU in accordance with some embodiments.

FIG. 5 illustrates an exemplary schematic diagram of a hardware environment 500 for implementing graph-to-stream mapping for a GPU in accordance with some embodiments. The hardware device in FIG. 5 illustrates the internal structures of a scheduler 520 and a GPU frontend (or a GPU accelerator) 530, as well as data and instruction flows among the scheduler 520, the GPU frontend 530, and an external storage/memory 510.

As shown in FIG. 5, the scheduler 520 may include multiple processors 522 and a cache 521 shared by the multiple processors 522. Each processor 522 may include an instruction fetching unit (IFU) 525, an instruction decoding unit (IDU) 526, an instruction transmitting unit (ITU) 527, and an instruction execution unit (IEU) 528.

In some embodiments, the IFU 525 may fetch to-be-executed instructions or data from the storage/memory 510 to a register bank 524. After obtaining the instructions or data, the scheduler 520 enters an instruction decoding stage. The IDU 526 decodes the obtained instruction according to a predetermined instruction format to determine operand(s) acquisition information, where the operands are required to execute the obtained instruction. In some embodiments, the operand(s) acquisition information may include pointers or addresses of immediate data, registers, or other software/hardware that provide the operand(s).

In some embodiments, the ITU 527 may be configured between the IDU 526 and the IEU 528 for instruction scheduling and management. It may efficiently allocate instructions to different IEUs 528 for parallel processing.

In some embodiments, after the ITU 527 allocates an instruction to one IEU 528, the IEU 528 may execute the instruction. However, if the IEU 528 determines that the instruction should be executed by the GPU frontend 530, it may forward the instruction to the corresponding GPU frontend 530 for execution. For example, if the instruction is directed to GNN computation based on an input graph, the IEU 528 may send the instruction to the GPU frontend 530 via a bus channel 531 for the GPU frontend 530 to execute the instruction.

In some embodiments, the GPU frontend 530 may include multiple streaming multiprocessors (SMs) 536 (4 SMs 536 are shown in FIG. 5, but those skilled in the art may appreciate that the GPU frontend 530 may also include other numbers of SMs 536), a command processor 537, and a direct storage access (DMA) interface 535, and the bus channel 531.

The bus channel 531 may include a channel through which instructions/data enter and exit the GPU frontend 530. The DMA interface 535 may refer to a function provided by some computer bus architectures, which enables devices to directly read data from and/or write data to the memory 510. Compared with the method in which all data transmission between devices passes through the scheduler 520, the architecture illustrated in FIG. 5 greatly improves the efficiency of data access. For instance, the core of the GPU frontend 530 may directly access the memory 510 and read the parameters of a neural network model (for example, the weight of each node in a graph) and/or input data.

The command processor 537 may be configured to allocate the instructions sent by the scheduler 520 via the IEU 528 to the GPU frontend 530 to the SMs 536 for execution. After the to-be-executed instructions enter the GPU frontend 530 from the bus channel 531, they may be cached in the command processor 537, and the command processor 537 may select the SMs 536 and allocate the instructions to the SMs 536 for execution. In addition, the command processor 537 may be also responsible for the synchronization operation among the SMs 536.

Each process, method, and algorithm described in the preceding sections may be embodied in, and fully or partially automated by, code modules executed by one or more computer systems or computer processors comprising computer hardware. The processes and algorithms may be implemented partially or wholly in application-specific circuitry.

When the functions disclosed herein are implemented in the form of software functional units and sold or used as independent products, they can be stored in a processor-executable non-volatile computer-readable storage medium. Particular technical solutions disclosed herein (in whole or in part) or aspects that contribute to current technologies may be embodied in the form of a software product. The software product may be stored in a storage medium, comprising a number of instructions to cause a computing device (which may be a personal computer, a server, a network device, and the like) to execute all or some steps of the methods of the embodiments of the present application. The storage medium may comprise a flash drive, a portable hard drive, ROM, RAM, a magnetic disk, an optical disc, another medium operable to store program code, or any combination thereof.

Particular embodiments further provide a system comprising a processor and a non-transitory computer-readable storage medium storing instructions executable by the processor to cause the system to perform operations corresponding to steps in any method of the embodiments disclosed above. Particular embodiments further provide a non-transitory computer-readable storage medium configured with instructions executable by one or more processors to cause the one or more processors to perform operations corresponding to steps in any method of the embodiments disclosed above.

Embodiments disclosed herein may be implemented through a cloud platform, a server or a server group (hereinafter collectively the "service system") that interacts with a client. The client may be a terminal device, or a client registered by a user at a platform, where the terminal device may be a mobile terminal, a personal computer (PC), and any device that may be installed with a platform application program.

The various features and processes described above may be used independently of one another or may be combined in various ways. All possible combinations and sub-combinations are intended to fall within the scope of this disclosure. In addition, certain methods or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, concurrently, or in some other manner. Blocks or states may be added to or removed from the disclosed example embodiments. The exemplary systems and components described herein may be configured differently than described. For example, elements may be added to, removed from, or rearranged compared to the disclosed example embodiments.

The various operations of example methods described herein may be performed, at least partially, by an algorithm. The algorithm may include program codes or instructions stored in a memory (e.g., a non-transitory computer-readable storage medium described above). Such an algorithm may comprise a machine learning algorithm. In some embodiments, a machine learning algorithm may not explicitly program computers to perform a function but can learn from training data to make a prediction model that performs the function.

The various operations of example methods described herein may be performed, at least partially, by one or more processors that are temporarily configured (e.g., by software) or permanently configured to perform the relevant operations. Whether temporarily or permanently configured, such processors may constitute processor-implemented engines that operate to perform one or more operations or functions described herein.

Similarly, the methods described herein may be at least partially processor-implemented, with a particular processor or processors being an example of hardware. For example, at least some of the operations of a method may be performed by one or more processors or processor-implemented engines. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented engines may be located in a single geographic location (e.g., within a home environment, an office environment, or a server farm). In other example embodiments, the processors or processor-implemented engines may be distributed across a number of geographic locations.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the subject matter has been described with reference to specific example embodiments, various modifications and changes may be made to these embodiments without departing from the broader scope of embodiments of the present disclosure. Such embodiments of the subject matter may be referred to herein, individually or collectively, by the term "invention" merely for convenience and without intending to voluntarily limit the scope of this application to any single disclosure or concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

Any process descriptions, elements, or blocks in the flow diagrams described herein and/or depicted in the attached figures should be understood as potentially representing modules, segments, or sections of code that include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

As used herein, "or" is inclusive and not exclusive, unless expressly indicated otherwise or indicated otherwise by context. Therefore, herein, "A, B, or C" means "A, B, A and B, A and C, B and C, or A, B, and C," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context. Moreover, plural instances may be provided for resources, operations, or structures described herein as a single instance. Additionally, boundaries between various resources, operations, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

The term "include" or "comprise" is used to indicate the existence of the subsequently declared features, but it does not exclude the addition of other features. Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

What is claimed is:

1. A computer-implemented method, comprising:
   receiving a computation graph for a graphics processing unit (GPU), the computation graph comprising (1) a plurality of nodes representing a plurality of kernels for the GPU to execute and (2) a plurality of edges representing execution dependencies among the plurality of kernels;
   performing one or more wave partitions on the computation graph to determine a plurality of waves of kernels, each wave comprising one or more kernels that are concurrently executable on the GPU;
   obtaining a kernel resource table comprising resource usage of each kernel;
   mapping the plurality of kernels into a plurality of streams based on the plurality of waves and the kernel resource table; and
   executing the plurality of streams on the GPU, wherein kernels mapped in a same stream are executed sequentially by the GPU, and kernels mapped to different streams are concurrently executable by the GPU.

2. The method of claim 1, wherein the mapping the plurality of kernels into the plurality of streams based on the plurality of waves and the kernel resource table comprises:
   for the one or more kernels from the same wave of the plurality of waves, identifying one or more kernels with resource usage being greater than a threshold;
   assigning the one or more identified kernels to the same stream; and
   assigning other kernels from the same wave to the plurality of streams in a round-robin manner.

3. The method of claim 1, wherein the obtaining the kernel resource table comprising the resource usage of each kernel comprises:
   obtaining the kernel resource table from a compiler compiling the plurality of kernels.

4. The method of claim 1, wherein the performing wave partitions on the computation graph to determine the plurality of waves of kernels comprises:
   performing breadth-first search (BFS) on the computation graph to determine a depth for each of the plurality of nodes in the computation graph; and
   determining one or more kernels from a same depth as a wave of kernels.

5. The method of claim 4, wherein the performing BFS on the computation graph to determine the depth for each of the plurality of nodes comprises:
   when one node appears on more than one paths in the computation graph, determining, based on BFS, more than one depths of the node respectively corresponding to the more than one paths; and
   determining a maximum depth of the more than one depths as a depth of the node.

6. The method of claim 1, wherein the plurality of streams comprise Compute Unified Device Architecture (CUDA) streams.

7. The method of claim 1, further comprising:
   inserting one or more synchronization kernels into one or more of the streams to maintain kernel dependency correctness between kernels.

8. The method of claim 7, wherein the inserting the one or more synchronization kernels comprises:
when a kernel at a front of a first stream depends on an execution of a kernel at a front of a second stream, inserting a synchronization kernel before the kernel at the front of the first stream so that the GPU executes the kernel at the front of the first stream only when the kernel at the front of a second stream is executed.

9. The method of claim 1, further comprising:
detecting load imbalance among the plurality of streams periodically; and
remapping a kernel from one stream to another stream to balance load among the plurality of streams.

10. The method of claim 9, wherein:
the computation graph is executed by the GPU for a plurality of iterations, and
the remapping of the kernel from one stream to another stream affects a current iteration of executing the computation graph and not future iterations.

11. The method of claim 1, wherein the executing the plurality of streams on the GPU comprises:
fetching kernels from heads of the plurality of streams; and
dispatching the fetched kernels to a plurality of Streaming Multiprocessors (SMs) for parallel processing.

12. The method of claim 11, wherein the fetching the kernels from the heads of the plurality of streams comprises:
fetching kernels from the heads of the plurality of streams in a round-robin manner.

13. A hardware accelerator for automatic and adaptive graph-to-stream scheduling for graphics processing units (GPUs), comprising:
a graph wave partition circuitry configured to:
receive a computation graph for a GPU, the computation graph comprising (1) a plurality of nodes representing a plurality of kernels for the GPU to execute and (2) a plurality of edges representing execution dependencies among the plurality of kernels; and
perform one or more wave partitions on the computation graph to determine a plurality of waves of kernels, each wave comprising one or more kernels that are concurrently executable on the GPU;
a kernel resource usage circuitry configured to:
obtain a kernel resource table comprising resource usage of each kernel;
a kernel-stream mapping circuitry configured to:
map the plurality of kernels into a plurality of streams based on the plurality of waves and the kernel resource table; and
a global dispatcher configured to:
dispatch the mapped kernels in the plurality of streams into a plurality of Streaming Multiprocessors (SMs) for parallel processing.

14. The hardware accelerator of claim 13, wherein the kernel resource usage circuitry is further configured to:
obtain the kernel resource table from a compiler compiling the plurality of kernels.

15. The hardware accelerator of claim 13, wherein the graph wave partition circuitry is further configured to:
perform breadth-first search (BFS) on the computation graph to determine a depth for each of the plurality of nodes in the computation graph; and
determine kernels from a same depth as a wave of kernels.

16. The hardware accelerator of claim 13, wherein the plurality of streams comprise Compute Unified Device Architecture (CUDA) streams.

17. The hardware accelerator of claim 13, further comprising:
a sync insertion circuitry configured to:
when a kernel at a front of a first stream depends on an execution of a kernel at a front of a second stream, insert a synchronization kernel before the kernel at the front of the first stream so that the GPU executes the kernel at the front of the first stream when the kernel at the front of a second stream is executed.

18. The hardware accelerator of claim 13, further comprising:
a kernel re-mapping circuitry configured to:
detect load imbalance among the plurality of streams periodically; and
remap a kernel from one stream to another stream to balance load among the plurality of streams.

19. The hardware accelerator of claim 18, wherein the computation graph is being executed by the GPU for a plurality of iterations, and
the remapping of the kernel from one stream to another stream only affects a current iteration of executing the computation graph but not future iterations.

20. A non-transitory computer-readable storage medium, the storage medium storing instructions that, when executed by one or more processors, cause the one or more processors to perform operations comprising:
receiving a computation graph for a graphics processing unit (GPU), the computation graph comprising (1) a plurality of nodes representing a plurality of kernels for the GPU to execute and (2) a plurality of edges representing execution dependencies among the plurality of kernels;
performing one or more wave partitions on the computation graph to determine a plurality of waves of kernels, each wave comprising one or more kernels that are concurrently executable on the GPU;
obtaining a kernel resource table comprising resource usage of each kernel;
mapping the plurality of kernels into a plurality of streams based on the plurality of waves and the kernel resource table; and
executing the plurality of streams on the GPU, wherein kernels mapped in a same stream are executed sequentially by the GPU, and kernels mapped to different streams are concurrently executable by the GPU.

* * * * *